United States Patent [19]

Masters

[11] Patent Number: 5,039,297
[45] Date of Patent: Aug. 13, 1991

[54] ROTATIONAL MOLDING APPARATUS

[76] Inventor: William E. Masters, 313 Dogwood La., Easley, S.C. 29640

[21] Appl. No.: 406,704

[22] Filed: Sep. 13, 1989

Related U.S. Application Data

[63] Continuation of Ser. No. 78,720, Jul. 28, 1987, abandoned.

[51] Int. Cl.⁵ .............................................. B29C 41/06
[52] U.S. Cl. ..................... 425/429; 264/310; 264/71; 425/435; 425/DIG. 238
[58] Field of Search ............... 425/425, 434, 435, 429, 425/253, 255, 150, 595, 576, 432, DIG. 23 B, DIG. 132; 264/310, 311, 308, 309, 312, 71, 72

[56] References Cited

U.S. PATENT DOCUMENTS

| | | | |
|---|---|---|---|
| 3,237,247 | 3/1966 | Eggert, Jr. et al. | 425/425 |
| 3,315,314 | 4/1967 | Barnett et al. | 425/425 |
| 3,350,745 | 11/1967 | Schott et al. | 264/311 |
| 3,383,429 | 6/1968 | Barnett et al. | 425/435 |
| 3,652,760 | 3/1972 | Petri | 264/310 |
| 3,822,980 | 7/1974 | Graeper | 425/429 |
| 3,942,618 | 3/1976 | Franklin | 425/62 |
| 4,247,279 | 1/1981 | Masters | 425/430 |
| 4,292,015 | 9/1981 | Hritz | 425/429 |
| 4,632,654 | 12/1986 | Lemelson | 425/150 |

FOREIGN PATENT DOCUMENTS

| | | | |
|---|---|---|---|
| 1429011 | 1/1969 | Fed. Rep. of Germany | 425/429 |
| 59-114019 | 6/1984 | Japan | 264/311 |
| 390963 | 12/1973 | U.S.S.R. | 425/435 |
| 591325 | 1/1978 | U.S.S.R. | 425/435 |

Primary Examiner—Jeffery Thurlow
Assistant Examiner—Mathieu Vargot
Attorney, Agent, or Firm—Cort Flint

[57] ABSTRACT

Rotational molding apparatus for molding a kayak and the like in a mold (12). The apparatus includes an oven (A) having an oven chamber (40). A frame (B) pivotally supports oven (A) above a ground floor (10). Mold (12) rotates about a roll axis (123) on a carriage (C) while in oven chamber (40). Oven (A) pivots about a pivot axis (72) in counter-pivotal movement. Oven pivot axis (72) is spaced a distance "d" from roll axis (123) of mold (12). This causes a pendular motion to be imparted to the mold (12). Mold (12) thus swings to and fro in an arc as oven (A) pivots. Mold (12) rotates about its roll axis (123) at the same time. A well-controlled, even distribution of plastic material in the mold occurs by this combination of motions. A desired pattern of heat distribution is applied along the length of mold (12) by a series of hot air openings (50a–50d) and a like number of openings on an opposing side of a hot air plenum (49).

25 Claims, 6 Drawing Sheets

ROTATIONAL MOLDING APPARATUS

This is a continuation of copending application(s) Ser. No. 07/078,720 filed on Jul. 28, 1987, now abandoned.

BACKGROUND OF THE INVENTION

The invention relates to rotational molding apparatus, and more particularly, to apparatus for rotationally molding a kayak and a like article as disclosed in U.S. Pat. No. 4,247,279. In this arrangement, a kayak mold is carried by a carriage. The carriage moves into and out of an oven. The mold is rotated in the heated oven about mutual orthogonal pitch and roll axes. The oven is required to be quite large to accommodate the rotation of the mold about the pitch axis. Efficiency is lost by heating the space.

Rotation of the mold about the pitch and roll axes serves to distribute the plastic material, typically in a powdered form, inside the mold. The distributed plastic material is heated to a molten state and distributed by the rotational motions to provide a desired skin thickness pattern for the hull. The mold has a long axis of curvature lengthwise. Motion about the pitch axis is limited to a pure rotational motion. Distribution of the plastic material over the longitudinal curve of the mold by pure rotational motion may be difficult to control, at times. The resin material tends to hold at one end and then pass rapidly over the center. The desired thickness build up at the center may not be provided. The material may be distributed in a sloshing type action if the rotation is too rapid. It is desirable to have more control over the distribution of the plastic material in the hull than can be provided by pure rotational movement of the mold in the pitch direction. U.S. Pat. No. 3,822,980 discloses another rotational molding machine in which an elongated mold is inserted into an oven. In this case, the mold is rotated about a roll axis while the entire oven is rotated about an axis which coincides with the pitch axis of the mold. The mold rotates about the pitch axis in pure rotational motion.

Accordingly, an important object of the present invention is to provide rotational molding apparatus with a heated oven having increased heat efficiency.

Another important object of the present invention is to provide a rotational molding apparatus which will rotate a mold in two degrees of freedom while requiring minimum heated oven space.

Still another important object of the present invention is to provide a rotational molding apparatus wherein increased control may be had over the distribution of plastic material in the mold.

Another object of the invention is to provide rotational molding apparatus having a mold which can be rotated about a roll axis while being moved in a pendular motion about a pivot axis lying in a plane parallel to but displaced from the plane of a roll axis.

Another object of the invention is to provide rotational molding apparatus in which a mold is rotated about a roll axis while being swung in a long arc in a pendular motion to provide for a more even and controlled distribution of plastic material in the mold.

Another important object of the invention is to provide rotational molding apparatus having a mold which rotates about a roll axis while inside an oven which is pivoted about a pivot axis so that the amount of interior space needed to accommodate the mold is minimized.

SUMMARY OF THE INVENTION

The above objectives are accomplished according to the present invention by providing rotational molding apparatus of the type having an oven, and a heated air source for melting plastic material in a mold inside the oven. A carriage supports the mold in the oven. A cooling stand adjacent the oven supports the carriage and mold while cooled. An oven track and a cooling stand track are aligned for guiding the carriage in and out of the oven. A first drive moves the carriage in and out of the oven. A second drive rotates the mold carried on the carriage about a roll axis. A frame pivotally supports the oven above a ground surface. The frame includes an oven pivot axis which lies in a plane parallel to the plane of the mold roll axis. The plane of the oven pivot axis is spaced a distance from the roll axis of the mold. A pendulum arm is measured by the distance between the oven pivot axis and the mold roll axis by which an effective pendular motion is imparted to the mold. A third drive pivots the oven to swing the mold to and fro while the mold rotates about its roll axis so that a prescribed distribution of plastic material is produced. The oven pivot axis may be provided by an adjustable pivot connector so that the pendulum arm length may be varied. By swinging the oven and mold about a pitch axis rather than the mold itself, the amount of space inside the oven required to accommodate the mold is minimized. The pendular motion of the mold may be done at a controlled rate to provide a desired distribution of the plastic material. Using an arc rather than a pure rotational pivot, the amount of dwell time the resin has as it crosses the mid-region of the mold is increased in proportion to the arc. In the arc swing, resin moves through the center section slower. The resin is allowed to flow past this region, causing more build-up and therefore thickness in the mid area. The hull skin thickness can be more uniform or distributed according to other controlled patterns. Dwell time may be provided at the ends of the arcuate motion for thicker hull skin at the ends may be provided in this manner. The small spheres of powdered plastic material roll and are distributed in a more controlled manner for melting in a prescribed skin pattern.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
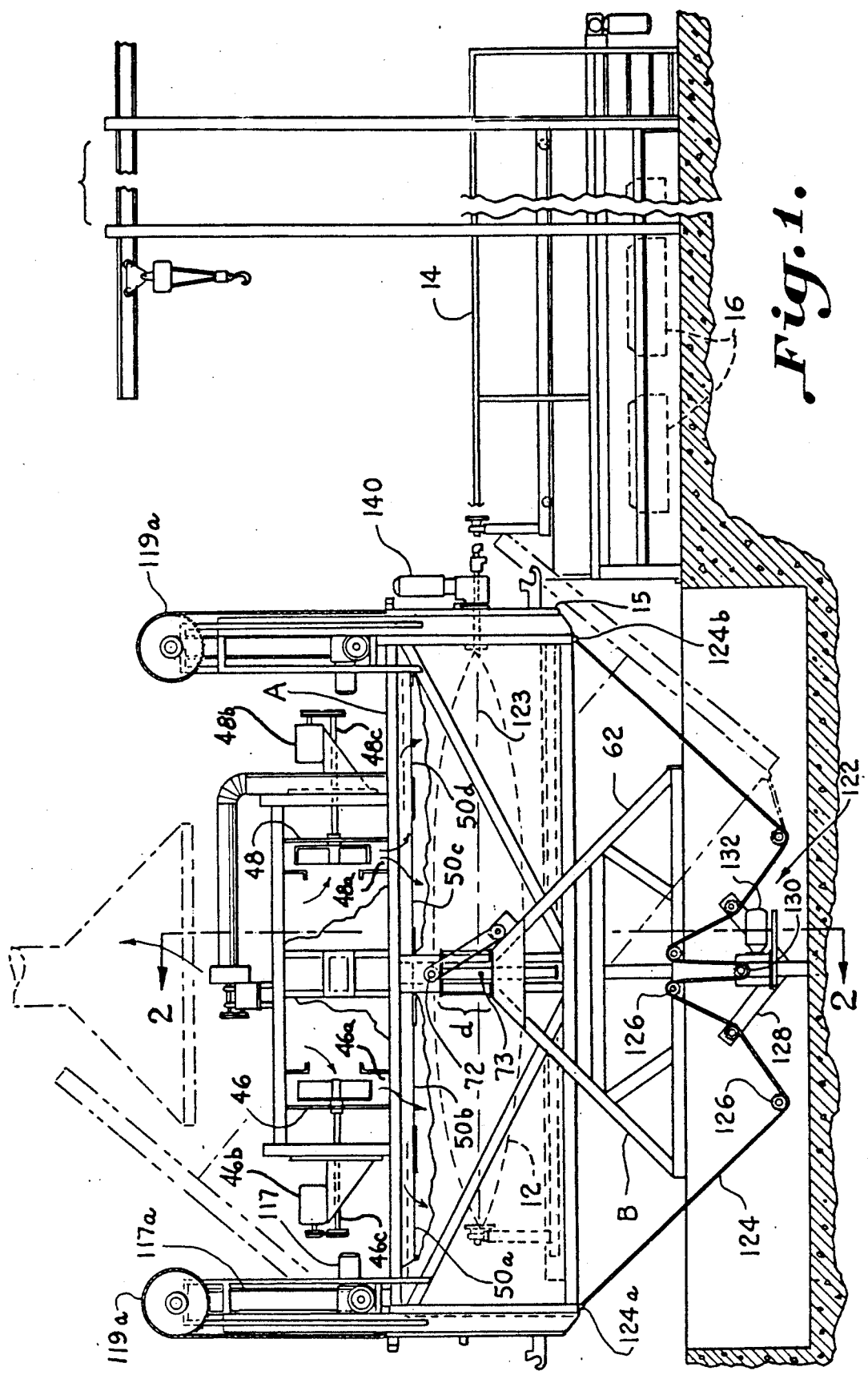
FIG. 1 is a side elevation illustrating rotational molding apparatus constructed in accordance with the present invention wherein a cooling stand is shown adjacent one end of a rotational molding oven, it being understood that an identical cooling stand may be duplicated at the opposing end of the oven so that the oven may be fed from both ends.

Referring now in more detail to the drawings, rotational molding apparatus is disclosed which includes an oven A carried by a frame B above a ground surface 10. A carriage C carries a mold 12 for movement in and out of the oven. A cooling stand 14 is adjacent an entrance end 15 of oven A on which the carriage and mold are cooled. For this purpose, a plurality of cooling fans 16 are arranged in series along the length of cooling stand 14.

Track means for guiding the carriage between oven A and cooling stand 14 is provided. As can best be seen in FIG. 3, the cooling stand track means includes a pair of spaced standards 18 and 20. Standard 20 has an inverted V-shaped rail 22 carried on its top. There is no rail on standard 18. Track means for oven A includes a pair of track grooves 24 and 26 formed in a floor 28 of oven A. An inverted V-shaped track rail 30 is fixed to the bottom of track groove 26. There is no rail in groove 24. Standards. 18, 20 and grooves 24, 26 are aligned and on the same level Means for interlocking the oven and cooling stand together during carriage movement may be provided if necessary.

Carriage C includes a pair of longitudinal runners 32 and 34 which ride in grooves 26 and 24. There are a plurality of wheels 36 carried by runner 32 which has a V-shaped groove 36a. The grooved wheels receive inverted V-rails 22 and 30. No rail is provided in groove 24 nor on standard 18 which interlock with the wheels or runner 34. This is to accommodate thermal expansion of the carriage. Due to the thermal expansion, difficulty may be encountered in aligning sets of wheels 36 on runners 32 and 34 with fixed, parallel rails, particularly on the cooling stand.

Figure 2:
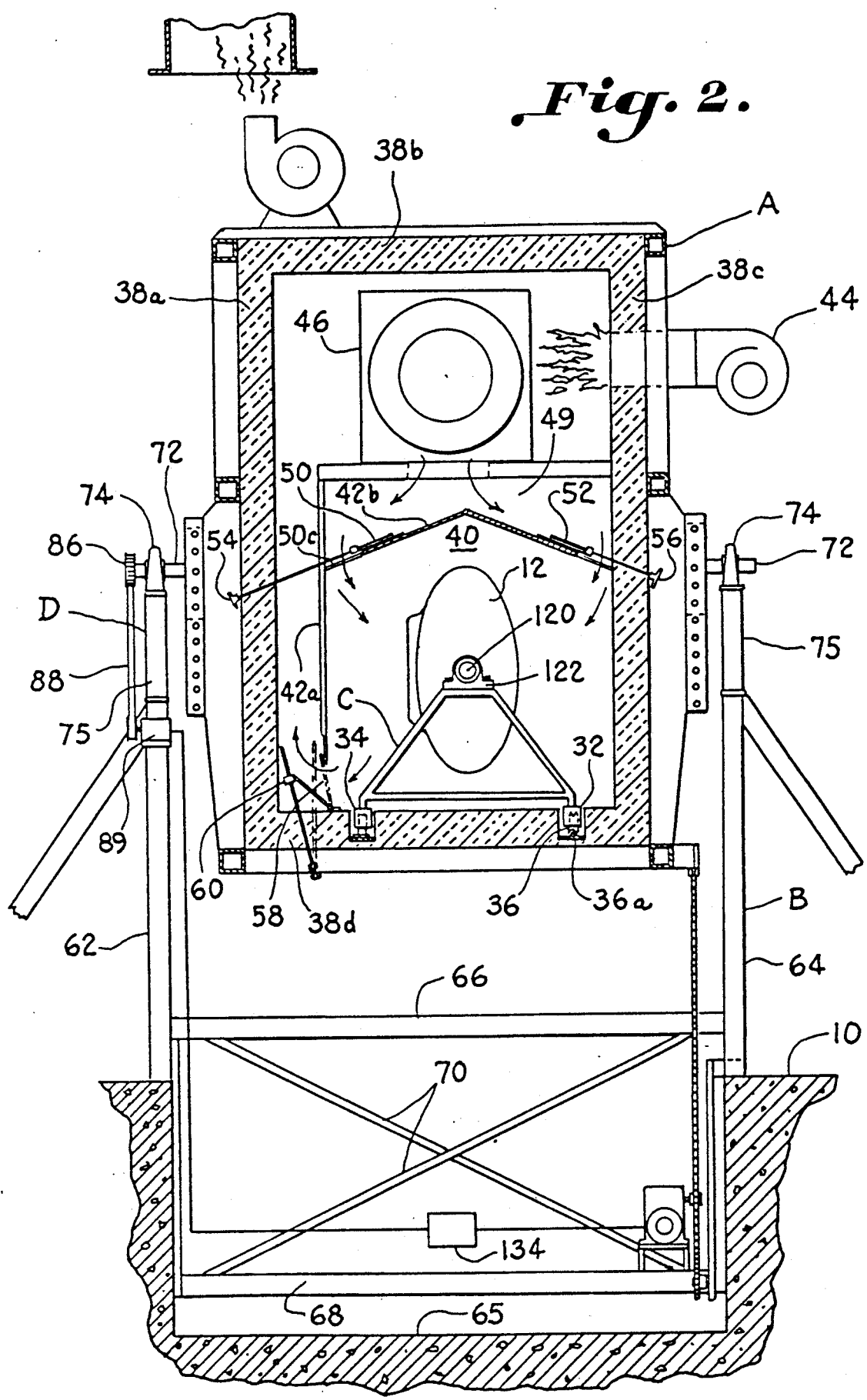
FIG. 2 is a sectional view taken along line 2—2 of FIG. 1.

Referring now in more detail to oven A, as can best be seen in FIGS. 1 and 2, oven A includes four insulated walls 38a, 38b, 38c and 38d. A heated oven chamber 40 is disposed within the insulated walls. An enclosure for oven chamber 40 is defined by insulated walls 38c and 38d, and a side wall 42a and a top enclosure 42b.

Heating means for supplying heated air to the oven chamber is provided by a gas burner 44 and a pair of blowers 46 and 48 having outlets 46a and 48a. The blowers are driven by fan motors 46b and 48b via drive shaft 46c and 48c. Outlets 46a and 48a communicating with a heat distribution plenum 49. A plurality of air doors 50 open and close a plurality of air entrance openings 50a through 50d along one side of top enclosure 42b which forms a bottom for plenum 49 (FIGS. 1 and 2). A series of air doors 52 open and close corresponding air openings on the opposite side of top enclosure 42b. Threaded screw rods 54 and 56 provide for adjusting the air doors 50 and 52. At the bottom of oven chamber is a plurality of cool air return openings 58 which may be adjustably opened by return air doors 60. Heated air is drawn in from the vicinity of burner 44 and distributed through air openings 50a through 50d, and 52a through 52d. Cool air is returned through openings 58. Plenum 49 and adjustable air openings along opposing sides of enclosure 42b provide means for equalizing the distribution of heat along the length of mold 12.

In practice, the innermost openings 50b and 50c may be closed more than the outermost openings 50a and 50d. This distributes more air to the outer openings 50a, 50d than inner openings 50b, 50c. In this manner, an even heat distribution is provided in chamber 40. Since mold 12 tapers to its ends, more heat is distributed the ends of the hull. Also, the hull skin is thicker in this area and more heat is desired.

Again, referring to FIGS. 1 and 2, frame means B can be seen to include a pair of A-shaped standards 62 and 64 which are supported on ground surface 10. A pit 65 is formed in ground floor 10 which receives additional framework as can best be seen in FIG. 2. This framework includes crossmembers 66 and 68 with diagonal bracing 70.

Figure 8:
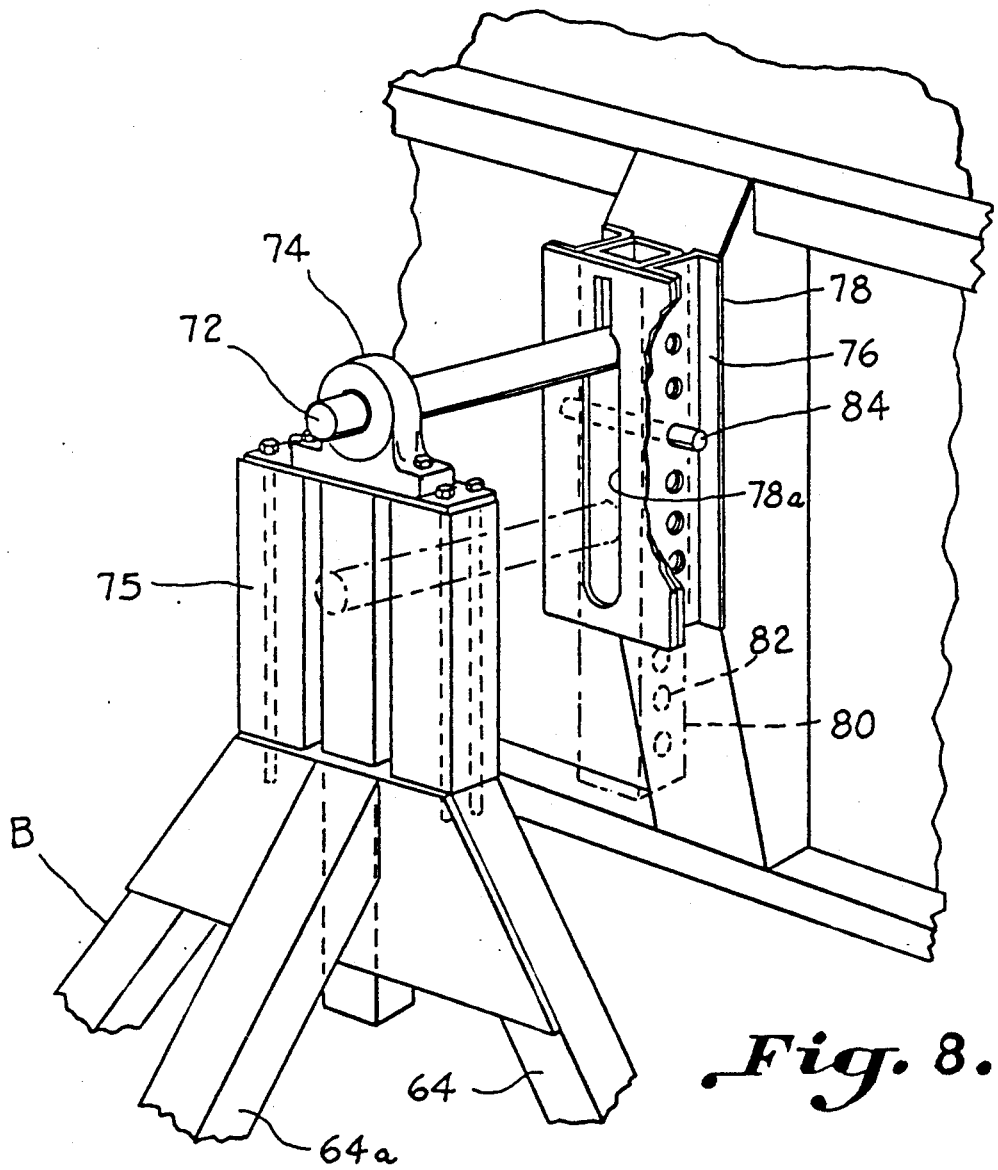
FIG. 8 is a partial perspective view illustrating a pendulum pivot for a dryer oven according to the invention.

As can best be seen in FIGS. 2 and 8, pivot connector means D is carried atop frame B for pivotally connecting oven A to frame B. Connector means D includes a pivot axis 72 about which oven A pivots on frame B. Pivot axis 72 is received in journals 74. Journals 74 are supported on blocks 75 affixed directly to the top of standards 62, 64. Adjustable pivot means is provided by an adjustable connector 76 affixed to each side of oven A. Adjustable connector 76 includes a slide box 78 affixed to the oven sides. There is a block 80 which slides within box 78. A slot 78a is in the front of box 78 through which pivot axis 72 extends. Pivot axis 72 has its other end affixed to block 80. A number of openings 82 are drilled through block 80. A pin 84 is inserted through the sides of pivot box 78 and openings 82 in block 80. In this manner, the pivot axis 72 may be set at different vertical positions relative to the oven to vary the height of the pivot axis. A toothed pulley 86 and a timing belt 88 are connected to an encoder 89 for global replace measuring the angle that oven A swings.

Figure 3:
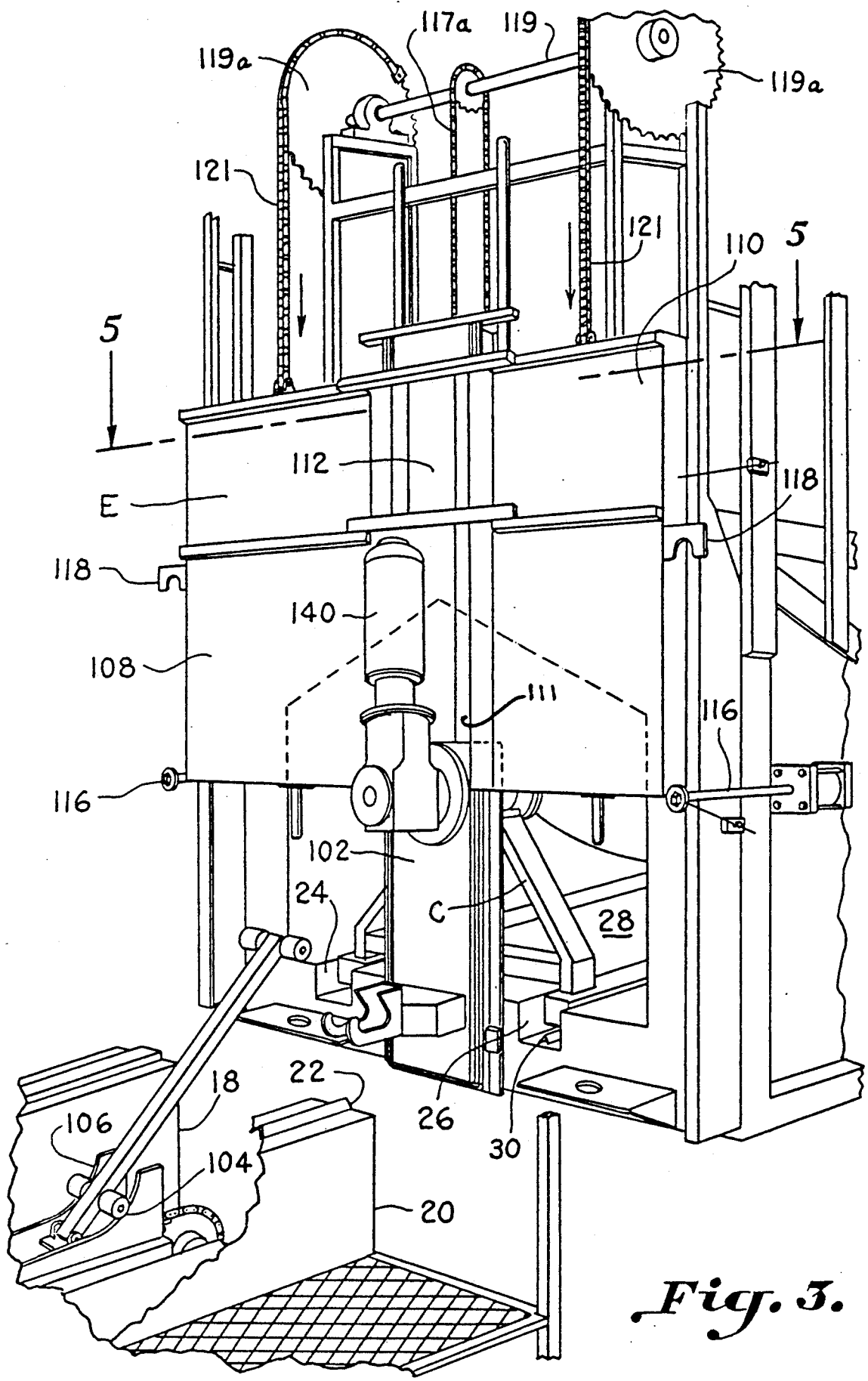
FIG. 3 is a perspective view of an entrance end of rotational molding apparatus constructed in accordance with the present invention.
Figure 4:
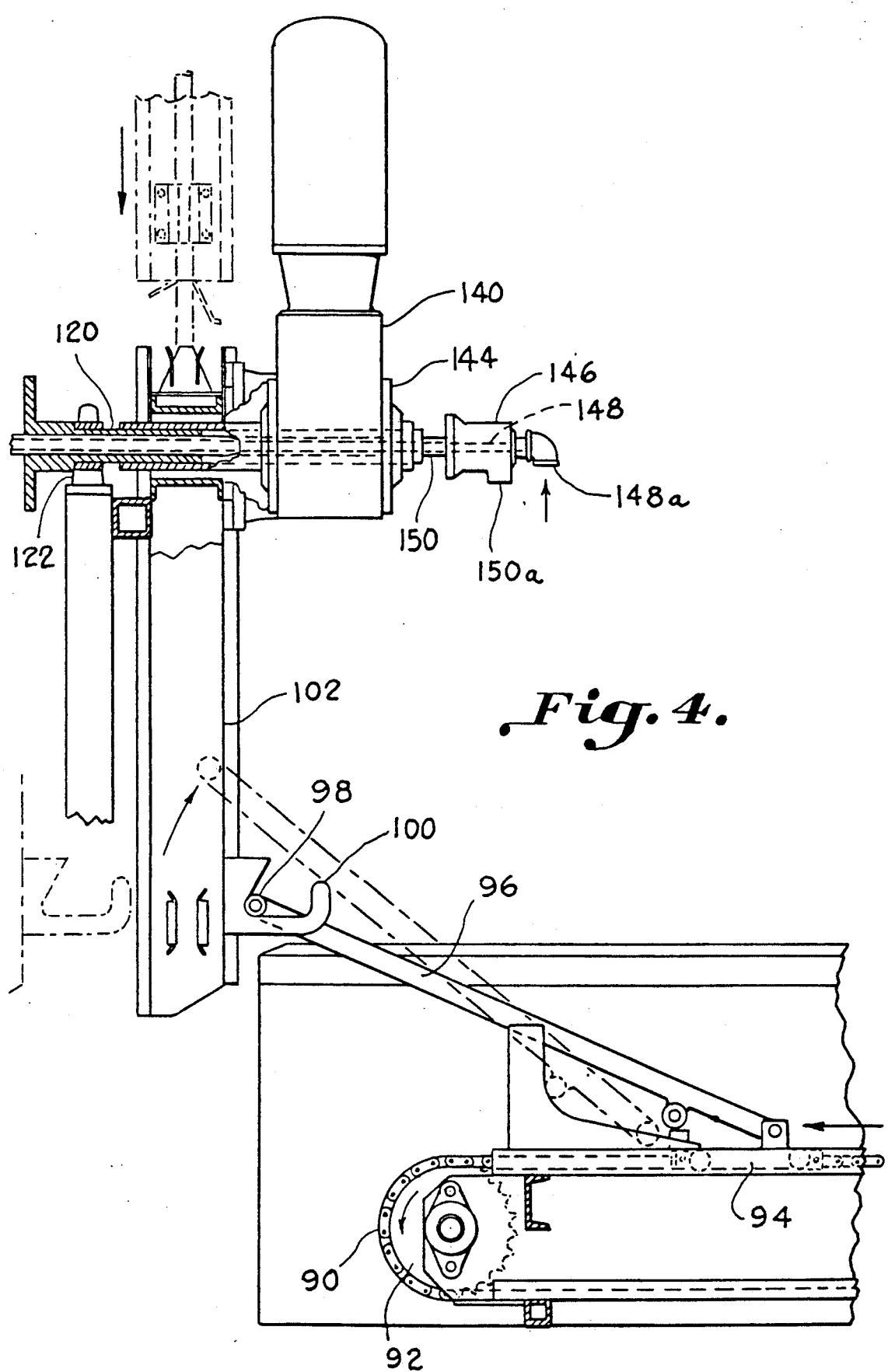
FIG. 4 is an enlarged view of the entrance end of rotational molding apparatus constructed in accordance with the present invention showing the drive for the mold carriage in more detail.
Figure 5:
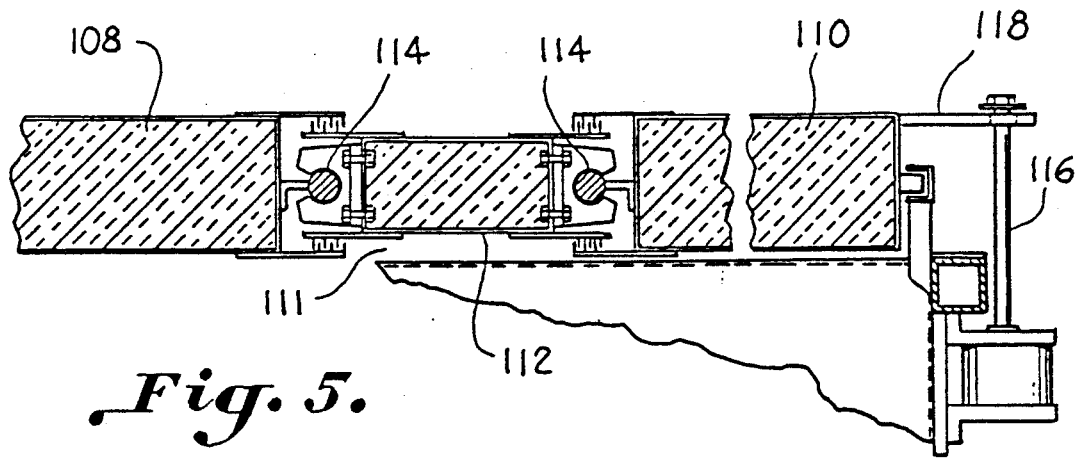
FIG. 5 is a section view taken along line 5—5 of FIG. 3.

As can best be seen in FIGS. 3 and 4, first drive means for moving carriage C in and out of the oven is provided by a driven drive chain 90, an idler sprocket 92, and a drive sprocket (not shown). There is a dog 94 carried by chain 90. A releasable drive connector 96 includes a T-shaped connector 98 which engages a hook-shaped carriage engagement member 100 affixed to end plate 102 of carriage C. Drive connector 96 engaged in member 100 pushes carriage C into the oven. Upon reaching a release position, a pair of rollers 104 slide up a ramp 106 to be lifted out of engagement member 100. Chain 90 is driven in a reverse direction to reverse the movement of carriage C.

An oven door assembly E slides down over entrance end 15 of the oven for closure. Door assembly E includes a pair of side panels 108 and 110 which are spaced apart to define a longitudinal opening 111. Opening 111 corresponds to the width of end plate 102 which is part of the carriage assembly and is slidably received in the opening. As side panels 108 and 110 slide over end plate 102, a slidable hatch 112 abuts the top of end plate 102. Hatch 112 rests on the top of end plate 102 as side panels complete closure of entrance end 15. A pair of guide rods 114 provide for relative sliding of hatch 112 and side panels 108 and 110. Suitable sealing structure is provided between the various sliding elements for insulating against heat loss.

Pneumatic door puller 116 are disposed on opposing sides of door assembly E for pulling the door tightly against the end walls of the oven for tight closure (FIG. 3). Door pullers 116 engage in slotted tabs 118 for pulling the door tightly closed. Pneumatic door closers 116 may be any suitable conventional air cylinder actuated by an air valve (not shown) either manually or automatically.

Actuating means for opening and closing door assembly E is provided by an electric drive motor 117 which drives a chain 117a through a sprocket (not shown). Chain 117a drives a shaft 119 which turns sprockets 119a. Door drives chains 121 are attached to sprockets 119a and fastened to door panels 108 and 110 to raise and lower door assembly E.

As can best be seen in FIGS. 1 and 2, mold 12 is carried on carriage C by means of axles 120 which are carried in journals 122 on opposing ends of carriage C. This provides a roll axis 123 about which mold 12 rotates on carriage C in a roll direction. Oven pivot axis 72 lies in a plane parallel to the plane of roll axis 123 and is spaced a distance above roll axis 123 (FIG. 1). Distance "d" represents a pendulum arm between oven pivot axis 72, which acts as the pitch axis of the mold, and roll axis 123 which imparts an effective pendular motion to the mold as the oven pivots in counter-rotational motions. Mold 12 swings to and fro in a pendular motion as oven A pivots back and forth. Mold 12 moves in a relatively long arc compared to pure rotational motion about a pitch axis in the same plane as roll axis 123. The pendular motion results in a more controlled and even distribution of the granular plastic material during molding operations. While the oven and molds swing to and fro, the mold is rotated about roll axis 123 in the oven. The width and height of oven chamber 40 may be made quite minimal since mold 12 does not rotate in a pitch direction in the oven. Pivot axis 72 may be adjusted vertically to vary the distance "d" and the length of the effective pendulum arm.

Third drive means for driving the oven in a counter-pivotal movements is provided by a chain and sprocket drive arrangement designated generally as 123. One end 124a of a chain 124 is attached at one end of oven A. A remote end 124b is attached to an opposing end of oven A. Drive chain 124 passes through a series of idler sprockets 126 and a pair of idler arms 128 which maintain tension. A drive sprocket 130 is affixed to a drive motor 132. Drive motor 132 may be controlled manually or automatically. For example, a control device 134 may be provided. The amount of angle rotation of oven A may be set by control device 134. Control device 134 may receive the angular measurement signal from encoder 90. If forty-five degrees is set in the control device 134, then when the oven has rotated forty-five degrees in one direction, the reverse drive will occur.

It has been found that rotation plus or minus thirty-five to forty-five degrees about the vertical is adequate. This results in a total arc of from seventy to ninety degrees through which the mold 12 is swung to and fro. In a typical operation when molding a kayak with granular cross-linked polyethylene, mold 12 will rotate about roll axis 123 at approximately eight rpm and will swing in an arc of seventy degrees in approximately one minute. The rate of the pendular motion of mold 12 may be controlled in any manner to provide a prescribed thickness pattern for the kayak hull being molded. For example, the mold may pause in its movement at the ends for thicker hull skin. Any combination of roll and pendular motion may be had for a desired skin thickness pattern.

Figure 6:
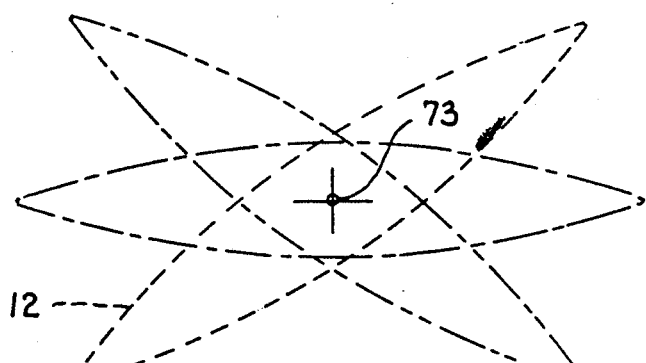
FIG. 6 is a schematic illustration of an elongated curved mold which rotates in pure rotation.
Figure 7:
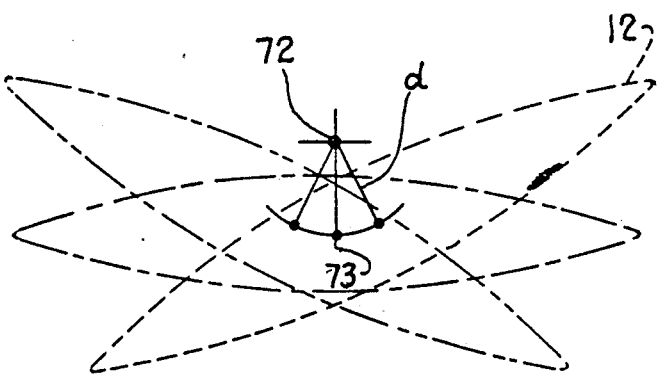
FIG. 7 is a schematic illustration of a curved mold being rotated in an arc about a point displaced from the point of pure rotation.
Figure 6A:
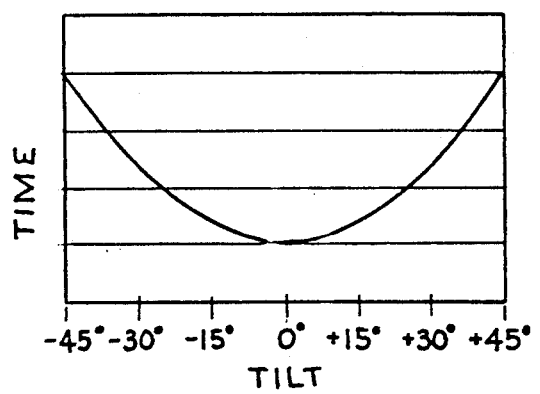
FIG. 6A is a graph of the dwell time of the plastic material deposited over the length of the mold during pure rotation.
Figure 7A:
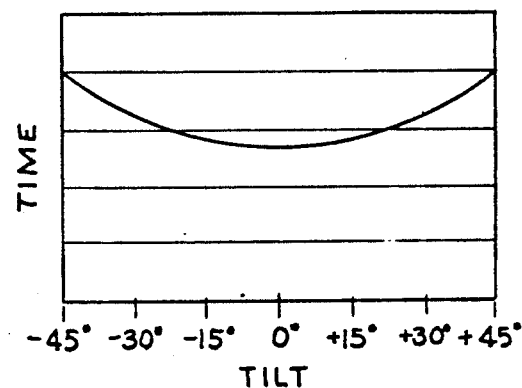
FIG. 7A is a graph representing the amount of time the resin is deposited on the length of the mold which is increased over the mid region of the mold.

FIG. 6 illustrates the rotation of an elongated curved mold 12 having a prescribed radius of curvature in pure rotation about roll axis 73. The resinous powder gets to point A on the mold and then tumbles to the other end passing the mid region of the mold quickly. FIG. 6 illustrates the dwell time for the resinous material deposited on the length of the mold from one forty-five degree tilt to the other. As can best be seen in FIGS. 7 and 7A, rotational mold 12 swings in an arc with the roll axis 72 displaced from pure rotation by distance "d", the powder moves more slowly through the mid region. More time is spent in the mid region as well as across the entire mold throughout the entire tilt cycle. If the mold could be swung in an arc corresponding to the radius of the curvature of mold 12, the time the powder is deposited in each section of the mold would be equal. For elongated curved molds such as used in molding kayaks, this is not practical, therefore, an arc of a smaller radius is utilized.

Third drive means for rotating mold 12 about roll axis 123 includes a motor 140 which drives rotary shaft 120 through a suitable rotary journal 144. A rotary union 146 is provided having a first passageway 148 and a second concentric passageway 150. First passageway 148 has an entrance 148a. Entrance opening 150a provides an opening to concentric passage 150. These passages 148 and 150 may be utilized to deliver air for actuating air valves (not shown) on mold 12 which serve to actuate conventional mold supply boxes (not shown) on the mold for delivering material at desired times in a conventional manner. In practice, the mold may be initially filled with plastic material before movement into the oven. A first hull skin layer may be formed from this material. Afterwards, by releasing one or two additional sources of plastic material in the oven, up to two additional layers of the same or different plastic materials may be formed in the hull. Thus, a hull skin may be formed of one to three-layers in a conventional manner.

Thus, it can be seen that an advantageous construction for apparatus for rotationally molding a kayak and other articles can be had in accordance with the present invention. A mold may be rotated in a small, efficient oven space about a roll axis. The oven may be pivoted and the mold swung in pendular motion for a more controlled and even distribution of plastic material. Using an arc rather than a pure pivot, the amount of dwell time the resin has as it crosses the midpoint of the mold is increased in proportion to the arc. The resin is allowed to flow past this region, causing more build-up and therefore thickness in the mid area. The hull skin thickness can be more uniform or distributed according to other controlled patterns. Sloshing of material is reduced by mold pitch movement in a controlled, long arc. While a preferred embodiment of the invention has been described using specific terms, such description is for illustrative purposes only, and it is to be understood that changes and variations may be made without departing from the spirit or scope of the following claims.

What is claimed is:

1. Apparatus for rotationally molding an article in a mold having a curvature, said apparatus including an oven, heating means for supplying heated air to said oven and mold, for melting resinous material inside the mold, a carriage for carrying a mold in and out of said oven, cooling means for cooling the mold, track means for guiding said carriage in and out of said oven, first driven means for moving said carriage in and out of said oven, and second drive means for rotating said mold carried by said carriage about a mold roll axis, wherein said apparatus comprises:

frame means for supporting said oven above a floor;

connector means carried by said frame means for pivotally connecting said oven to said frame means including an oven pivot axis spaced a distance above said mold roll axis;

a pendulum arm defined by the distance between said oven pivot axis and said mold roll axis by which an effective pendular motion is imparted to said mold as said oven pivots in counter-pivotal motion; and third drive means for swinging said oven in said counter-pivotal motion about said pivot axis as said mold rotates about said mold roll axis inside said oven in a manner that said mold swings to and fro in a controlled arc having a curvature curved in the direction of said curvature of said mold so that dwell time during which said resinous material crosses a mid-region of the mold is increased in proportion to the arc and a prescribed distribution of plastic material may be produced within said mold.

2. The apparatus of claim 1 wherein said connector means includes means for adjustably positioning the vertical position of said oven pivot axis.

3. The apparatus of claim 1 wherein said oven pivots in an arc of plus or minus approximately thirty-five to forty-five degrees with respect to a vertical.

4. The apparatus of claim 3 including means for controlling the counter-pivotal motion of said oven about said pivot axis to control the time and manner that said mold swings to and fro in said pendular motion.

5. The apparatus of claim 1 wherein said heating means comprises heat distributing means for controlling the distribution of heat along the length of said mold in said oven in a manner that said mold is heated along its length according to a desired heat distribution pattern.

6. The apparatus of claim 5 wherein said heat distributing means includes a heated air distribution plenum, a plurality of air doors longitudinally spaced along the length of said air plenum and said mold, and means for adjusting said air doors so as to distribute more or less heated air to longitudinal areas of said mold.

7. The apparatus of claim 1 wherein said second drive means includes a rotary union carried by an end of said carriage, and said rotary union including at least one air passage for delivering air to said mold for actuating a material supply valve.

8. The apparatus of claim 7 wherein said rotary union includes two concentric passages for admitting two independent supplies of air to said mold for actuating two independent material supply valves.

9. The apparatus of claim 1 including a floor pit formed in said ground floor below the level of said floor, accommodating pivotal movement of said oven, said frame means supporting said oven for counter-pivotal movements in and out of said floor pit.

10. The apparatus of claim 9 wherein said track means includes cooling stand and oven tracks which guide said carriage, said cooling stand and oven being spaced above said floor so said cooling stand and oven tracks are aligned and on the same level.

11. A rotational molding apparatus for molding an object having a curvature comprising:

an oven having a generally enclosed heating chamber with at least one entrance end being open for the in and out movement of a rotating mold having a curvature corresponding to said object;

a mold carriage for carrying said mold in and out of said oven chamber;

said mold having a first rotational axis about which said mold rotates in a roll direction while carried by said carriage; and pivot means for swinging said mold in said oven chamber to and fro about a second rotational axis while said mold rotates about said first rotational axis, said second rotational axis being displaced above said first rotational axis a prescribed distance thereby defining a pendular arm so that said mold swings in a pendular motion having an arc with a curvature curved in the same direction as the curvature of said object and having a prescribed length so that the dwell time of said plastic material as it crosses a mid region of said mold is controlled and said material is distributed along said curvature of said mold in a predetermined pattern.

12. The apparatus of claim 11 wherein said pivot means includes a frame for pivotally supporting said oven above a ground floor and which includes an oven pivot axis about which said oven pivots in counter rotational motion which is said second rotational axis.

13. The apparatus of claim 12 wherein said mold carried by said carriage rotates about said first rotational axis which is a roll axis inside said oven while said oven rotates about said oven pivot axis which is spaced a distance from said mold roll axis.

14. The apparatus of claim 12 wherein said pivot axis is adjustable in its position relative to said mold roll axis.

15. Apparatus for rotationally molding an article in a mold, said apparatus including an oven, heating means for supplying heated air to said oven and mold, carriage means for carrying a mold in and out of said oven, a cooling stand adjacent said oven supporting said carriage means and mold for cooling, track means for guiding said carriage means in and out of said oven, first drive means for moving said carriage means in and out of said oven, second drive means for rotating said mold carried by said carriage means about a mold roll axis, wherein said apparatus comprises:

a carriage means which moves entirely into said oven, for movement with said oven in an operational position, and said carriage means includes an end plate having a front and rear side, and said rear side of said end plate forming an exterior wall of said oven when said carriage means is entirely enclosed with said oven;

said second drive means carried by said front side of said end plate; and being connected to said mold on the rear side of said end plate;

means to swing said mold in said oven about a pivot axis spaced a distance above said mold roll axis;

an oven door assembly opening and closing at least one end of said oven;

said oven door assembly being open to allow said carriage and mold to move in and out of said oven;

said door assembly including a pair of vertically movable side panels which slide vertically relative to said end plate when said carriage is in said operational position, said side panels being spaced apart to define a medial longitudinal opening having a width corresponding generally to the width of said carriage end plate;

a vertically slidable hatch panel slidably received between said side panels closing said longitudinal opening;

door actuating means for moving said door assembly to a vertically raised position in which said oven end is open and said carriage may move in and out of said oven;

said door actuating means moving said door assembly to a closed position in which said carriage end plate is received between said side panels; and said hatch panel riding generally atop said carriage end plate as said door assembly is moved to said closed position and said carriage means is in said operational position to allow said carriage end plate to be received between said side panels.

16. The apparatus of claim 15 including a frame supporting said oven above a ground surface in a manner that said oven pivots relative to said frame.

17. The apparatus of claim 15 wherein said first drive means is carried by said cooling stand and is connected in driving engagement with said carriage.

18. The apparatus of claim 17 wherein said carriage includes a drive engagement member and said first drive means includes a drive connector which may be releasably connected with said drive engagement member.

19. The apparatus of claim 15 including a door puller for pulling said door assembly against said entrance end of said oven to close said door tightly.

20. The apparatus of claim 15 wherein said track means includes an oven track and a cooling stand track, said oven and cooling stand having parallel tracks, and said carriage including parallel runners which run on said oven and stand tracks.

21. The apparatus of claim 20 including a track rail carried on only one of said parallel tracks of each of said oven and said cooling stand tracks to accommodate for thermal expansion of said carriage.

22. Apparatus for rotationally molding an article in a mold having a curvature, said apparatus including an oven, heating means for supplying heated air to said oven and mold, carriage means for carrying a mold in and out of said oven, a cooling stand adjacent said oven supporting said carriage and mold for cooling, track means for guiding said carriage in and out of said oven, and first drive means for moving said carriage in and out of said oven, second drive means for rotating said mold carried by said carriage means about a mold roll axis, wherein said apparatus comprises:

said carriage including an end plate having a front and rear side;

said second drive means carried by front side of said end plate; and being connected to said mold on the rear side of said end plate;

an oven door assembly opening and closing at least one end of said oven;

said oven door assembly being open to allow said carriage and mold to move in and out of said oven;

said door assembly including a pair of side panels spaced apart to define a medial longitudinal opening having a width corresponding generally to the width of said carriage end plate;

a slidable hatch panel slidably received between said side panels closing said longitudinal opening;

door actuating means for moving said door assembly to a raised position in which said oven end is open and said carriage may move in and out of said oven;

said door actuating means moving said door assembly to a closed position in which said carriage end plate is received between said side panels;

said hatch panel riding generally atop said carriage end plate as said door assembly is moved to said closed position to allow said carriage end plate to be received between said side panels;

a frame supporting said oven about a ground surface in a manner that said oven pivots relative to said frame; and a pivot connection pivotally connecting said oven to said frame which includes an oven pivot axis lying in a first plane, and said roll axis lying in a second plane parallel to and below said first plane wherein said first and second planes are spaced a distance apart so that an effective pendulum arm is defined between said oven pivot axis and a center of said mold as defined by the intersection of said roll axis and a pitch axis lying in said second plane; and third drive means for swinging said oven about said pivot connection on said frame in an arc having a curvature curved in the same direction of the curvature of said mold.

23. Apparatus for rotationally molding an elongated, curved article including a curved mold having a prescribed radius of curvature corresponding to that of said article, means for rotating said mold about a roll axis and a pitch axis perpendicular to the roll axis, heater means for heating a plastic material inside said mold while said mold is rotated about said roll and pitch axes, and cooling means for cooling said mold once said plastic material has been sufficiently melted and distributed over the inside of said rotating mold, wherein the improvement comprises:

means for supporting said mold for rotation about a pitch axis displaced a prescribed distance above said roll axis thereby defining a pendulum arm and means to swing said mold in an oven in a prescribed arc about a pivot point lying on the pitch axis, said arc having a curvature curved in the same direction as said curvature of said mold so that the dwell time in which the resin crosses the mid region of the mold is increased in direct proportion to the length of the arc so that a prescribed pattern of material thickness over the length of the article may be had.

24. The apparatus of claim 23 wherein said means for supporting said mold for rotation includes a pitch axis about which said mold rotates in an arc having a radius less than the radius curvature of said mold but greater than a radius of pure rotation of said mold so that the amount of dwell time of the plastic material crossing the mid region of the curved mold is increased relative to pure rotation of the mold.

25. The apparatus of claim 22 wherein said cooling stand and said oven include aligned floor tracks which are on the same level spaced above said ground floor.

* * * * *